July 17, 1951   O. A. DOHERTY   2,560,560
STATOR FOR UNIVERSAL ELECTRIC MOTORS
Filed March 29, 1949
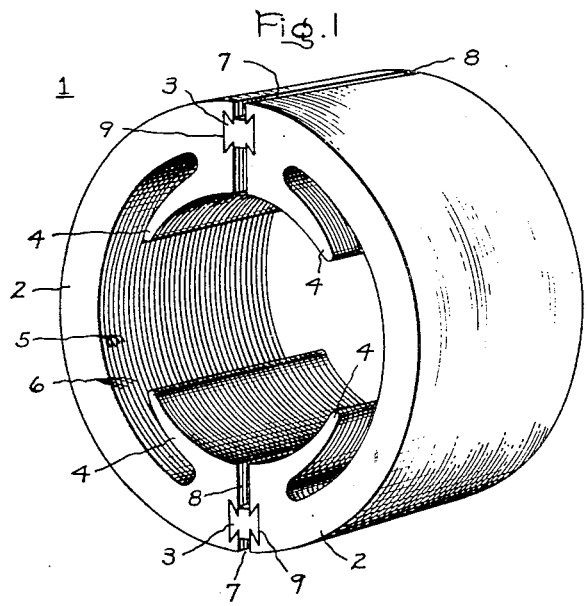
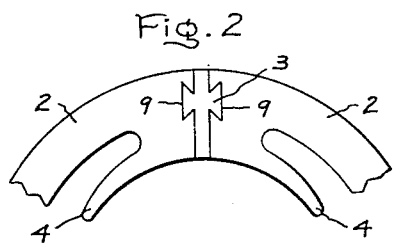
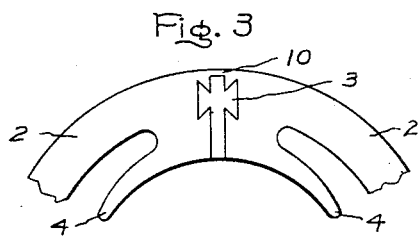
Inventor
Orval A. Doherty
by Prowell S. Mack
His Attorney Patented July 17, 1951

2,560,560

UNITED STATES PATENT OFFICE 2,560,560

STATOR FOR UNIVERSAL ELECTRIC MOTORS

Orval A. Doherty, Fort Wayne, Ind., assignor to General Electric Company, a corporation of New York Application March 29, 1949, Serial No. 84,022

5 Claims. (Cl. 171—252)

My invention relates to dynamoelectric machines, more particularly to dynamoelectric machines of the commutator type having stator members provided with salient field poles. More specifically, the invention relates to universal electric motors, for operation on both alternating current and direct current, of the type having a salient pole stator member in which the magnetic structure is arranged to compensate for the armature reaction of the rotor member.

In commutator-type dynamoelectric machines it is necessary, for maximum efficiency, to effect substantial neutralization of the armature reaction at the point of commutation. This is especially important for universal motors which must operate on either alternating or direct current. Various means are employed to neutralize the armature reaction of such motors, among which is the method of constructing the stator in a manner such that the field magnet structure of the stator automatically compensates for the armature reaction. One form of such a construction compensated stator provides a two-pole magnetic structure which is divided by a layer of non-magnetic material through the center of each field pole along a plane coinciding with the center line of the motor. This construction permits approximately the same air gap flux as if the field poles and magnetic structure were not divided but provides a high reluctance path for armature reaction flux through the magnetic structure of stator, thus substantially neutralizing the armature reaction.

It is an object of this invention to provide an improved type of construction for construction compensated stator members of the divided pole type.

It is a further object of the invention to provide a construction for stator members of this type which is simple and inexpensive.

A still further object of my invention is the provision of a form of construction for stator members of the divided pole type which is readily adaptable to mass production techniques and procedures.

In carrying out my invention in one form, I provide a stator member for a dynamoelectric machine in which the magnetic structure is composed of a substantially circular yoke portion of laminated magnetic steel divided into two semi-circular segments. On opposite sides of the center line of the magnetic yoke, two projections extend radially inward from the yoke to form two field poles. Each such polar projection and the portion of the yoke from which it projects is split along a plane which coincides with the center line of the yoke. Each split surface of a yoke segment along this plane has a dovetail groove parallel to the center line and extending entirely across the split surface in which is located a portion of a non-magnetic rivet-like retaining member. These retaining members securely join the two semi-circular segments of the circular magnetic yoke and in addition they serve as non-magnetic spacers separating the two segments. At the same time, as a result of the close fit of the retaining members in the grooves, they serve to retain in the correct position the laminations of which the yoke segments are constructed.

For a more complete understanding of my invention, reference should be had to the accompanying drawing, Fig. 1 of which is a perspective view of a stator member embodying my invention in one preferred form; Fig. 2 is a partial view in elevation of a stator embodying a modification of my invention; while Fig. 3 is a partial view in elevation of a stator embodying an additional modification of my invention.

Referring to Fig. 1 of the drawing, a stator member in which one form of my invention is incorporated is designated generally by the numeral 1. The stator 1 has a substantially circular magnetic yoke portion composed of two duplicate yoke segments 2 separated by non-magnetic rivet-like members 3. The substantially semi-circular yoke segments 2 have two radially inward projections 4, each of which forms half of a salient field pole. Taken together, two adjacent, closely spaced, but slightly separated projections 4 form a field pole adaptable for the location thereon of a suitable exciting winding (not shown). Yoke segments 2 and their inward projections 4 are laminated, being made of a plurality of relatively thin arcuate flat sheets 5 of magnetic material, preferably steel. The flat sheets 5 are perpendicular to the center line of stator member 1, with adjacent sheets being preferably separated by a thin layer 6 of electrically insulating material in order to substantially prevent eddy currents due to alternating magnetic flux in the magnet structure composed of the yokes and field poles. Yoke members 2 and polar projections 4 thereon are separated by diametrically opposed slots or spaces 7 on opposite sides of the center line of stator 1. The spaces 7 are coplanar, with the plane along which they lie coinciding with the center line of stator 1 and the center lines of the field poles, thus dividing field poles 4, 4 into two equal portions.

Each inner surface 8 of a yoke segment 2 which faces a similar surface on the other like segment has a longitudinal inverted wedge-shaped, or dovetail groove 9 extending completely across the surface parallel to the center line of stator 1 adapted to contain a portion of a rivet member 3. Each opposite similar surface on the opposing segment also has a groove 9 extending completely across it parallel to the center line at approximately the same radial distance from the center line. Rivet member 3 is made of non-magnetic material such as bronze, for example, and has an inverse wedge-shaped projection on each side adapted to fit in grooves 9. Rivets 3 serve to join yoke segments 2 and at the same time serve to maintain them in the desired relationship, separated magnetically by air spaces 7 and non-magnetic rivets 3. The rivets or retaining members 3 also maintain laminations 5 in the correct, closely spaced parallel relationship. This is accomplished by rigidly supporting the laminations 5 which make up yoke segments 2 in the correct position during the stator construction process by means of suitable jigs. Rivets 3, with the side projections thereon having approximately the same dimensions as grooves 9, are then inserted between yoke segments 2, filling two opposing grooves 9 in the two yoke segments simultaneously, and expanded in the conventional manner by blows on the ends of the rivets. The blows expand the bodies of the rivets so that they retain the laminations 5 securely in place.

An alternate method of constructing a stator in accordance with my invention is to place the laminations 5 in a suitable holding and molding fixture, force molten non-magnetic material under pressure between the yoke segments into grooves 9 and the desired portions of spaces 7, and allow the material to cool and solidify. If proper molds are used, a rivet or retainer 3 can be formed in this manner which has substantially the same shape and performs all the functions of a preformed rivet which is inserted and then upset by blows on the ends.

One modification of my invention is illustrated by Fig. 2 of the accompanying drawing, in which like numerals represent like parts with Fig. 1. In this modification, retaining members 3 completely fill the spaces between opposing radial surfaces of yoke segments 2 eliminating air spaces 7 which are present in Fig. 1. Members 3 in this modification are of non-magnetic but electrically conductive material such as brass, aluminum or stainless steel. Since members 3 are electrically conductive, eddy currents are induced in them by alternating magnetic flux in the abutting yoke segments 2 and the presence of these eddy currents further restricts the presence of magnetic flux between the yoke segments. This results in a more efficient magnetic separation between the yoke segments 2 than when they are separated by a non-electrically conductive medium such as non-conductive rivets combined with air spaces.

Another modification of the invention is illustrated in Fig. 3 of the drawing in which it can be seen that a small bridge 10 of laminated magnetic material connects the two yoke segments across the outer radial extremity of non-magnetic spacer 3. While this construction does not provide as great an increase in reluctance in the magnetic circuit of the armature reaction flux as if bridge 10 were not present, it still produces a very substantial increase in the reluctance and provides sufficient armature reaction compensation for some types of motors. Most of the armature reaction flux tends to concentrate near the faces of the field poles, so a small magnetic connection along the outer surface of the magnetic yoke has a smaller effect on the reluctance of the magnetic circuit of the armature reaction flux than would a similar connection nearer to the center line of the yoke.

While the stator member 1 of the drawing has two polar projections 4, 4, it will be readily apparent that this construction is equally applicable to multi-polar stators having four or more poles. Furthermore, while a laminated magnetic structure is shown, it will be readily understood that yoke segments of solid magnetic material may be used. A stator constructed in accordance with my invention is especially applicable to universal motors but may be used also for other commutator type dynamoelectric machines including series, shunt, and compound wound.

While I have illustrated and described one preferred embodiment of my invention, together with two modifications thereof, many additional modifications will occur to those skilled in the art and, therefore, it should be understood that I intend to cover by the appended claims any such modifications which fall within the true spirit and scope of my invention.

What I claim as new and desire to secure by Letters Patent of the United States is:

1. A stationary member for a dynamoelectric machine comprising a substantially circular yoke portion composed of a plurality of laminations of magnetic material, a polar projection extending radially inward from said yoke, a second polar projection diametrically opposite said first projection extending radially inward from said yoke, said yoke and said first-named and said second-named projections being split along a diameter of said yoke extending substantially through the centers of said first-named and said second-named projections forming two substantially semi-circular yoke segments, each of the split surfaces of said segments having a dovetail groove parallel to the center line of the yoke, and combination spacer and retainer members of non-magnetic material positioned between the split surfaces of said yoke segments in said grooves joining said yoke segments together and retaining in position the laminations of which they are composed, said combination members also separating said segments magnetically whereby a path of high reluctance is provided for armature reaction flux.

2. An armature reaction compensated stator member for a commutator type motor, said stator member comprising a substantially circular magnetic yoke portion composed of a plurality of flat laminations of magnetic material, a projection extending radially inward from said yoke to form one field pole, a diametrically opposed second projection extending radially inward from said yoke to form a second field pole, said yoke and said first-named projection and said second-named projection being divided by a gap extending along a plane coinciding with the center line of said yoke and passing through the centers of said first-named projection and said second-named projection forming two yoke segments, each of said segments having in each of the surfaces adjacent to said gap an inverted wedge-shaped groove adapted to contain a portion of a spacer and retainer member, and non-magnetic spacer and retainer members having corresponding inverted wedge-shaped projections on each side positioned between said yoke segments in said grooves, said spacer and retainer members joining said two yoke segments together and maintaining in position the laminations of which they are composed and separating said two yoke segments magnetically whereby a path of high reluctance is provided for armature reaction flux.

3. In a commutator electric motor of the universal type for operation on either alternating current or direct current, an armature reaction compensated stator comprising two magnetic yoke and pole members substantially semi-circular in form positioned to form a substantially circular outer surface, each such yoke and pole member comprising a plurality of laminations of magnetic steel and having a dovetail groove extending entirely across each radial surface of a yoke and pole member which is adjacent to a similar surface on the opposite yoke and pole member, inwardly extending portions of each such combination yoke and pole member forming half of two magnetic field poles, and non-magnetic spacer members having inverted wedge-shaped projections on each side thereof positioned in said grooves separating said two combination yoke and pole members, the two said yoke and pole members forming together two opposite field pole projections magnetically divided by said spacer members along a common plane through said center line, said spacer members serving also to join the two said semi-circular yoke and pole members and retain in position the laminations of which said yoke and pole members are comprised through the action of said inverted wedge-shaped projections on said dovetail grooves.

4. In a commutator type dynamoelectric machine, an armature reaction compensated stator comprising a plurality of combination yoke and pole members positioned to form a substantially circular magnetic yoke, each such yoke and pole member comprising a plurality of laminations of magnetic material, radially inward extending portions of each said yoke and pole member forming half of each of two magnetic field poles, each combination yoke and pole member having a dovetail groove in each radial surface thereof which opposes a corresponding surface on each adjacent yoke and pole member, and non-magnetic spacer and retainer members having inverted dovetail projections on opposite sides thereof positioned between adjacent yoke and pole members engaging said grooves, said yoke and pole members forming a plurality of field pole projections divided radially by said spacer and retainer members, said spacer and retainer members joining said yoke and pole members and retaining in position the laminations of which said yoke and pole members are comprised through the engagement of said projections in said dovetail grooves whereby to form a unitary stator member.

5. A stationary member for a dynamoelectric machine comprising a substantially circular yoke portion composed of a plurality of laminations of magnetic material, a polar projection extending radially inward from said yoke, a second polar projection diametrically opposite said first projection extending radially inward from said yoke, said first-named and said second-named projections having radial slots therein extending outward along a plane through the centers of said projections forming two substantially semi-circular yoke segments connected by transverse bridges of magnetic material at the base of said slots, each of the side surfaces of said slots having a dovetail groove parallel to the center line of the circular yoke, and combination spacer and retainer members of non-magnetic material positioned in said slots in engagement with said grooves maintaining said laminations in position and separating said yoke segments magnetically except for said bridges whereby a path of high reluctance is provided for armature reaction flux.

ORVAL A. DOHERTY.

REFERENCES CITED

The following references are of record in the file of this patent:

UNITED STATES PATENTS

| Number | Name | Date |
|---|---|---|
| 335,998 | Fisher | Feb. 9, 1886 |
| 664,247 | Entz | Dec. 18, 1900 |
| 1,353,658 | Kostko | Sept. 21, 1920 |

FOREIGN PATENTS

| Number | Country | Date |
|---|---|---|
| 115,595 | Switzerland | Sept. 1, 1926 |